United States Patent [19]

Meetze, Jr.

[11] 3,974,798

[45] Aug. 17, 1976

[54] METHOD AND APPARATUS FOR STUDYING LABORATORY ANIMAL BEHAVIOR

[76] Inventor: Murray O. Meetze, Jr., 2742 Gervais St., Columbia, S.C. 29204

[22] Filed: Apr. 21, 1975

[21] Appl. No.: 569,599

[52] U.S. Cl. ............................... 119/1; 119/29
[51] Int. Cl.² ............................. A01K 29/00
[58] Field of Search ............. 119/1, 29; 235/92 MT; 340/279; 128/25

[56] References Cited
UNITED STATES PATENTS

| | | | |
|---|---|---|---|
| 3,439,358 | 4/1969 | Salmons | 340/279 |
| 3,540,413 | 11/1970 | Castaigne | 119/1 |
| 3,633,001 | 1/1972 | Vajnovszky | 235/92 MT |

*Primary Examiner*—Hugh R. Chamblee
*Attorney, Agent, or Firm*—Wellington M. Manning, Jr.

[57] ABSTRACT

A walled enclosure or cage is provided in which laboratory animals may be maintained for observation and evaluation. The floor of the enclosure is provided by a plurality of conductive bar elements that are spacially separate and extend across the bottom of the enclosure. Spacial separation of the bars insulates one from the other and further, space is provided in the floor to remove animal waste, excess food and the like. An electrical resistor is connected between each two adjacent conductive bars and cooperate with the bars to define a resistor network to which a closely controlled feed current is supplied. An animal makes contact with the conductive bars which lowers resistance of the network and produces a voltage change. The resistor network is a.c. coupled to a differential amplifier, and a comparator which receive pulses from capacitors between the network and the amplifier and prepare same for an interface means for a pulse recording system. The amplified pulse may be shaped, divided or the like as required by the recording system. The method of using the present system involves detection of contact between an animal foot and the conductive grid bars, whereupon contact area determines the resistance of the network and a proportional signal is produced therefrom. The signal is then amplified, manipulated to avoid ambient electrical interference, such as an incidental electrical field from line current at 60 Hertz, and/or shaped, divided or the like to provide input to a particular recording system. Raw data from the recording system can then be correlated to locomotor activity of the laboratory animal.

19 Claims, 4 Drawing Figures

METHOD AND APPARATUS FOR STUDYING LABORATORY ANIMAL BEHAVIOR

BACKGROUND OF THE INVENTION

Systems have been developed heretofore for determining locomotor activity of laboratory animals. Hence after a particular exterior or administered stimulus, such as diet variation, a stimulant, drugs, period of time, environment or otherwise has been administered to a laboratory animal or the animal subjected thereto, the animal activity may be related to the effect of the stimulus. Study of the locomotor behavioral activity can then be used to predict similar animal or related human response to the stimulus. Earlier devices and methods have involved, like the present invention, recording of animal movement, using electrical means for detecting and analyzing same. It is believed, however, that the present invention represents an improvement thereover.

Illustrative of earlier prior art techniques is the Castaigne U.S. Pat. No. 3,540,413. Castaigne shows a housing having a rod floor with each rod having an electrically conductive center portion therethrough. Castaigne utilizes an electrical field that is obtained from line current such as 60 Hertz (50 Hertz in Europe) and generates a signal responsive to the animal contact with a sensing surface located in the electrical field. The Castaigne device is in general, quite similar to a "touch switch" that is commonly used for elevators to call the elevator to a particular floor or to signal the elevator to proceed to a particular floor. Insofar as the Castaigne device is concerned, contact once recorded must thereafter be broken before a further response is detected.

The Stigmark et al U.S. Pat. No. 3,656,456, is a further device that has been produced. Stigmark et al utilizes an alternating current electrical bridge and detects changes in capacitance across the bridge to produce a recordable response therefrom. The type responses recorded are set to be highly sensitive or of low sensitivity to detect large or small movements.

A further analagous system is a speed measuring device of Zipser, U.S. Pat. No. 3,580,083, that is used to determine a rate of speed and/or distance covered by a person running in place. An electrical pulse is generated with each footfall which is then used to produce a signal that is discrete insofar as repetitiveness and is calculated as to duration so as to determine both distance and speed.

Applicant's device on the other hand, is believed to be yet another approach with improved potential for measuring the behavioral activity of laboratory animals. A signal input is produced for a recorder, computer or the like which may be later analyzed to evaluate activity of the test animal.

SUMMARY OF THE INVENTION

It is an object of the present invention to provide a method and apparatus for determining the behavioral activity of laboratory animals.

A further object of the present invention is to provide a walled laboratory enclosure wherein the floor of the enclosure is provided by a plurality of electrically conductive bars, which form a part of an electrical pulse formation and recording system.

Still another object of the present invention is to provide an improved system for determining behavioral activity of laboratory animals by measuring and counting the footsteps of the animal in an enclosure.

Yet another object of the present invention is to provide a system for determining behavioral patterns of laboratory animals which is compatible with more than one recording system.

Generally speaking, the apparatus of the present invention relates to a device for measuring the behavioral activity of laboratory animals by counting the footsteps of same comprising a walled enclosure, said enclosure having a floor adjacent the lower end thereof, said floor comprising a plurality of spaced apart elements, at least certain of said elements being electrically conductive and being connected to adjacent conductive elements by a resistor connected thereacross, said resistor-conductive element network having a closely controlled feed current supplied thereto, said network producing a voltage signal upon foot contact by the laboratory animal with one of the conductive elements, and means to generate a pulse from the signal and manipulate the pulse to be compatible with a particular recording system.

More specifically, apparatus of the present invention comprises a walled enclosure that is preferably produced from transparent plastic panels which permit visual observation of the laboratory animal within same. Walls at opposite ends are drilled so as to receive floor elements therein. The nonconductive wall thus insulates the conductive elements and in a preferred embodiment space is provided between adjacent bars to permit the passage of animal waste, excess food and the like therethrough. A resistor is electrically connected between each adjacent conductive element as mentioned above. This resistor network is then provided with a source of current whose amplitude is closely controlled. A network current is utilized below the threshold at which current is detected by the animal's body, and at a level where interfering noise is avoided.

In a preferred arrangement, a differential amplifier is a.c. coupled to the resistor network by capacitors which generate a pulse from the signals generated by the network when an animal's foot makes contact with one of the conductive grid bars. Subsequent to the differential amplifier, a comparator may also be utilized to differentiate the amplified pulse signals from an incidental electrical field at 60 Hertz that surrounds line current. Subsequent to this point, the isolated and amplified pulse signal may be manipulated as needed to provide compatible input for a desired recording system.

Exemplary of the manipulator arrangement is a one-shot multivibrator which shapes a pulse of short duration for use in logic systems. Coupled to the one-shot multivibrator might be a divide digital counter, such as a divide by ten counter which receives a pulse from the multivibrator and provides a single pulse for each ten received. Coupled to the digital counter could be a further one-shot multivibrator which provides a 0.1 second pulse that is suitable for use with electromagnetic recorder systems. Further, a driver-relay combine may be included to complete the sequence, with the relay then being connectable to a desired recording system.

The method according to the present invention generally comprises the steps of providing a walled enclosure having conductive elements forming at least a portion of the floor of same, said conductive elements being provided with resistors connected to each adjacent conductive element to provide a resistor network; providing a source of line current to said resistor network, said current being controlled at an amperage less than the threshold at which the current is detected by a laboratory animal's body; placing a laboratory animal in the enclosure, whereby an electrical pulse is produced from voltage signals generated at each discrete animal footstep; segregating the generated pulse from ambient interference, and manipulating the pulse to be compatible with a particular recording system.

More particularly, the method of the present invention comprises the steps of providing a walled enclosure of a transparent material, said enclosure having spacially separate conductive elements across the bottom thereof that define a floor. A laboratory animal is housed in the enclosure under test stimulus conditions. Thereafter, as the animal moves about the enclosure, foot contact is made with the conductive floor elements. The conductive elements that define the floor are insulated from each other along the length thereof, and are electrically connected by resistors connected across adjacent elements. Line current of low amperage is provided for the network. Area of skin in contact with the floor through the conductive elements in a primary determinative as to the amount of current which will flow through the animal's body. While the feet of the animal maintain a certain resistance, the tail of the animal in similar fashion to fur, has a sufficiently high resistance that the network will not be affected to the point of detection.

Discrete detection of footsteps is electronically recorded via a pulse network. In the network, the pulses produced from signals from the resistor network are manipulated in such fashion as to be compatible input to a particular type recorder or recording system. Once recorded, the raw data of the footsteps of the animal may be correlated to the test stimulus to achieve meaningful statistical data of the affect of the stimulus on the animal. Likewise, other analyses may be made of the data as desired. Stimulus as used herein refers to materials administered to the animals, habitat conditions for the animals, or any other variable to be studied where locomotor behavioral activity of the animal could be related thereto.

DESCRIPTION OF THE PREFERRED EMBODIMENTS

Figure 1:
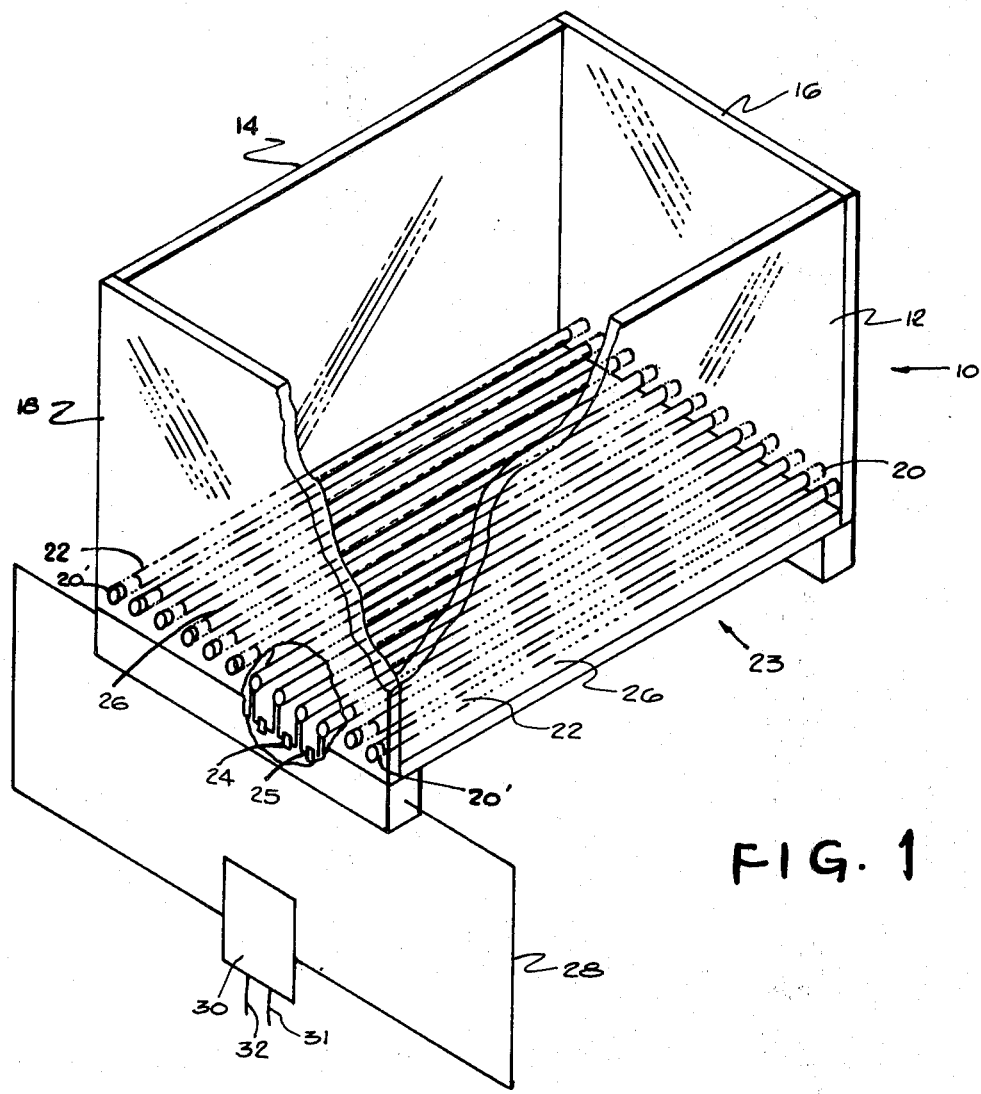
FIG. 1 is an isometric view of an animal enclosure according to teachings of the present invention.

Referring to the Figures, preferred embodiments of the present invention will now be described in detail. In FIG. 1, an enclosure, generally illustrated as 10 is shown. Enclosure 10, as illustrated, has upstanding side walls 12 and 14 and end walls 16 and 18. Enclosure 10 may, however, take any physical shape or form that is common in the art so long as the present detection and pulse handling means are included therewith. For example, the test enclosure may be isolated to preclude extraneous interference other than electrical which is provided for hereinafter. Also, numerous appurtenances may be included such as atmospheric condition controls, and the like. End walls 16 and 18 are provided with a plurality of openings 20 and 20', respectively, across the lengths thereof. An elongated element 22 is received in each opening 20 and 20' to cooperate with other elements 22 and define a floor generally indicated as 23 across the bottom of enclosure 10. At least certain of the floor elements 22 are electrically conductive and as illustrated, all elements 22 are conductive. A plurality of resistors 24 are in electrical connection with two adjacent rods 22 by conductors 25. This particular feature of the invention will be described hereinafter.

As illustrated in FIG. 1, the side walls and end walls 12, 14, 16 and 18 are preferably transparent in nature and may be manufactured from any suitable material. It should be understood, however, that the particular materials of construction, transparency and the like of the walls of enclosure 10 do not per se, form a part of the invention, except insofar as attachment of conductive elements 22 to the bottom of the end walls to define a floor thereacross. Note in this regard that conductive elements 22, which are preferably stainless steel rods are separated so as to define a space 26 between each two rods. In so doing, each of the conductive rods is insulated from the other, while at the same time, openings 26 are provided in the bottom of the cage to permit animal refuge, excess food and other materials to pass through the bottom of enclosure 10 to a suitable tray or receptacle therefor (not shown). Resistors 24 and conductive elements 22 cooperate to define a resistor network. Line current is supplied to the resistor network as described hereinafter. Note further that an electronic assembly 30 is electrically connected to the resistor network through conductors 28. Assembly 30 is schematically illustrated in block form and could include the elements specified hereinafter. Furthermore, a pair of conductors 31 and 32 are shown attached to assembly 30. Such means are provided to permit connection of the assembly to a recording system.

Figure 2:
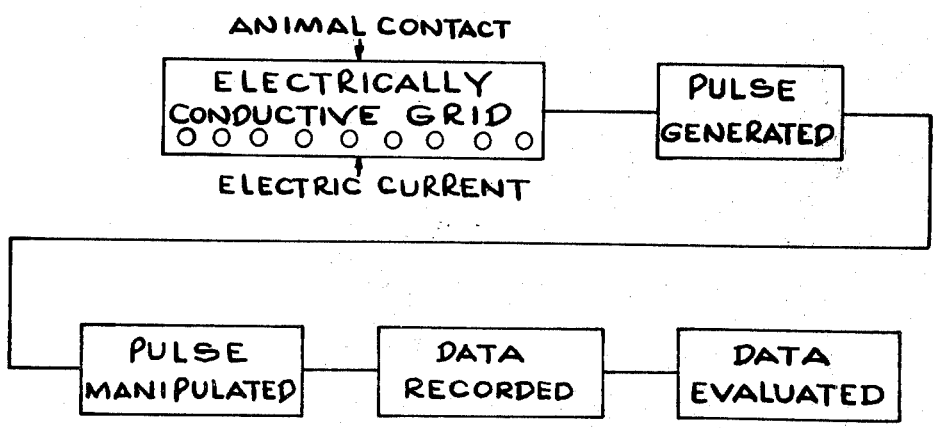
FIG. 2 is a block diagram generalizing the teachings of the present invention.

In FIG. 2, the general program of operation of the present invention is set forth. As schematically illustrated, an enclosure is provided with a conductive floor. Animal contact is then made with the conductive elements of the floor whereupon, depending upon the area of contact, a voltage signal is generated. Electric current involved is below the threshold of tactile sensation of the animal. The signal is then converted to a pulse and the pulse is manipulated in some manner according to the dictates of electronics to be compatible input for a predetermined type of recorder. Over a period of time, the recorder which could be a chart recorder, a counter, a logic system, or the like, accumulates raw data by way of counting of the discrete animal steps. Once obtained, the data provides input into a statistical program such that the effect of the programmed stimulus on the behavioral patterns of the test animals can be correlated.

Figure 3:
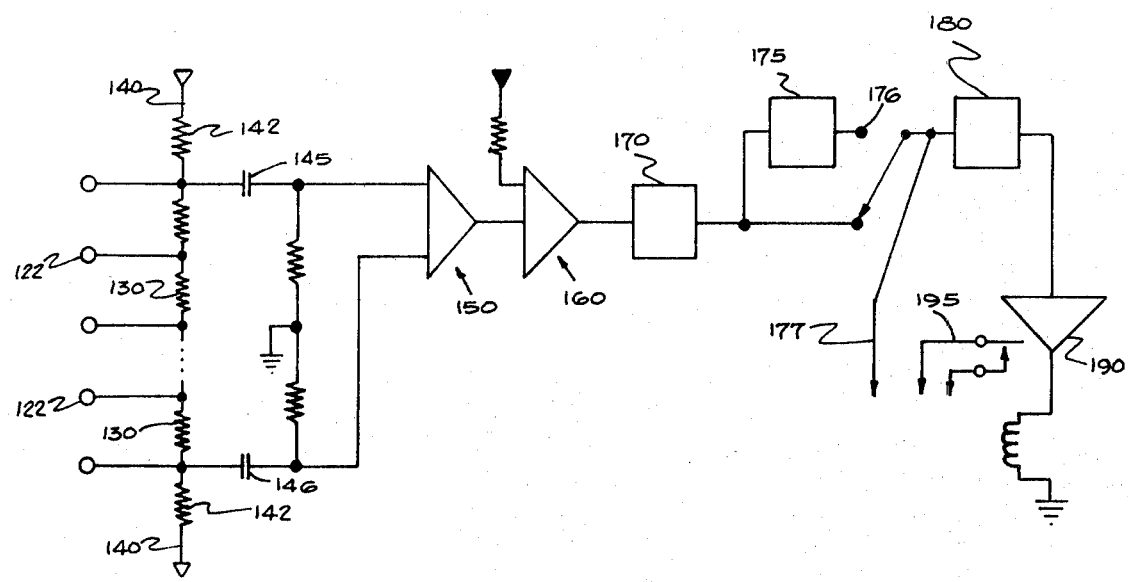
FIG. 3 is an electrical schematic diagram of a circuitry arrangement according to the present invention.

Making reference to FIG. 3, a more detailed schematic of the electrical arrangement is illustrated. Grid bars 122 are illustrated having resistors 130 connected therebetween. Supply current which may be a regulated voltage supply or a regulated current supply is provided for the network through conductors 140. Current controlling resistors 142 are provided along connectors 140 with a regulated voltage and may be provided with a regulated current. Amperage of the current may thus be controlled to a very low magnitude (less than 50 microamps) a point below the tactile threshold of current through the animal. Current passes through the animal's body undetected by the animal, whereby no exterior stimulus is provided by virtue of a current surge. The grid bar-resistor network is then a.c. coupled to a differential amplifier through capacitors 145 and 146 generally indicated as 150. The common mode rejection of the differential amplifier 150 eliminates any interference with 60 Hertz fields that result due to line current. The minimum degree of amplification of the pulse is generally determined by the total resistance of the resistor-grid bar network, and the current supplied thereto. Generally, as illustrated in FIG. 1, a separate resistor 24 is provided between each two adjacent conductive bars 22. In certain arrangements, however, a single resistor may be electrically connected between further pairs of conductive elements by electrically connecting the elements, for example.

Subsequent to the differential amplifier 150, the voltage pulse is received by a comparator 160. In comparator 160, the voltage pulse which has been amplified by a factor of 1,000 for example, is segregated from any 60 Hertz noise that remains. At this point, an amplified voltage pulse has been produced resulting from the area contact between the animal's foot and the conductive grid bars. The pulse may now be handled according to various techniques to result as meaningful raw data for statistical analysis. For example, a one-shot multivibrator 170 is provided downstream of the comparator and shapes a signal pulse for Transistor Transistor Logic (TTL), Metal Oxide Semiconductive (MOS) applications and the like.

The particular manipulation or treatment of the amplified pulse is determined by the ultimate utilization of the pulse or the apparatus to which the pulse provides input. As mentioned above, the one-shot multivibrator prepares the pulse of a particular shape and duration that is suitable for TTL logic applications. Likewise, a second one-shot multivibrator 180 may be utilized to suitably shape the pulse for actuation of a driver 190 for a relay 195. Output from the relay 195 is then suitable input for certain recorders or the like (not shown). A divide by ten, decade counter or the like 175 may be provided in line between the one-shot multivibrators 170 and 180, as illustrated, to divide the pulses by 10 and facilitate recording when less resolution is required. As is shown in the circuitry in FIG. 3, a switch 176 is provided to actuate the decade counter 175 when desired. Logic output from the one-shot multivibrator 170 is located between multivibrators 170 and 180 and is illustrated as connector 177 for association with the desired apparatus. While all of the above pulse manipulation apparatus is illustrated, only that required to the particular recorder system is needed. One embodiment of the present invention contemplates a package where all of the pulse manipulation apparatus is provided to make the present unit compatible with any conventional recording system.

Figure 4:
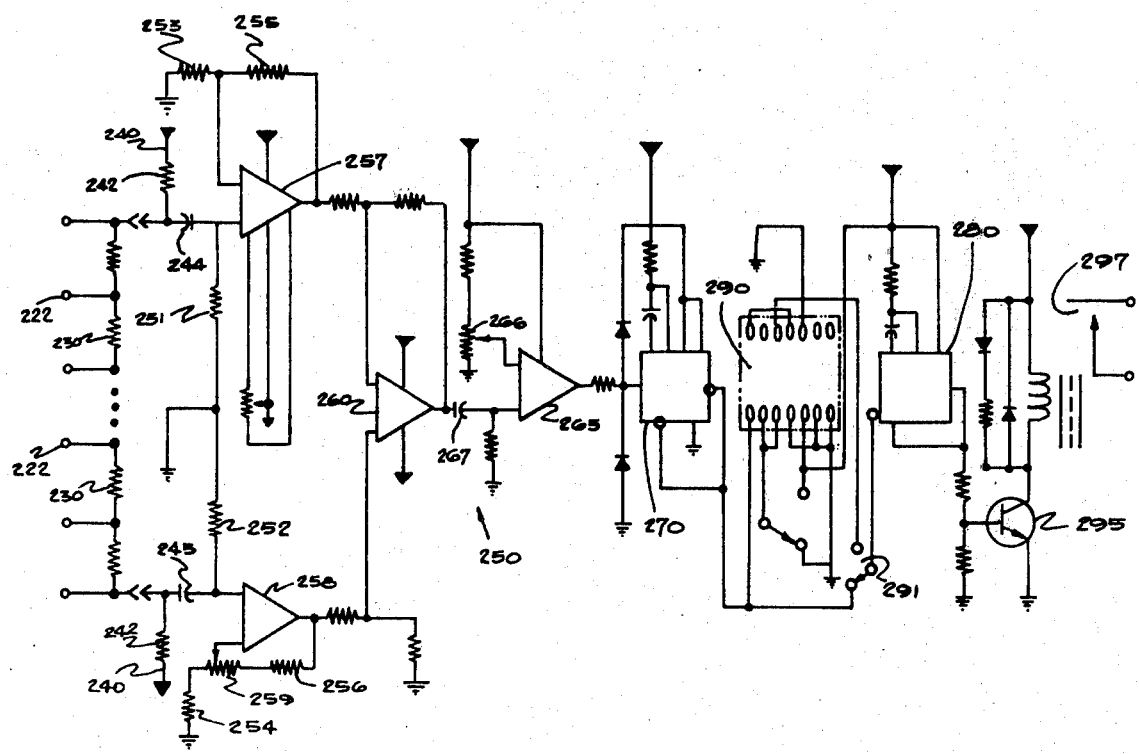
FIG. 4 is an electronic schematic diagram illustrating more detailed circuitry of an embodiment according to the teachings of the present invention.

A further illustration of suitable apparatus for the electronics according to the present invention, is illustrated in FIG. 4. A source of current is provided along conductors 240, being limited to amplitude to less than 50 microamps by a pair of current limiting resistors 242 and use of a regulated voltage supply. Grid bars 222 are shown which are spacially separate at the bottom of the cage as illustrated in FIG. 1 and are electrically connected to each adjacent conductive grid bar 222 by a suitable resistor 230. While it may be possible to utilize only a portion of the floor of the enclosure for the conductive elements, it is preferred that at least every other bar be a conductive one from the electrical sense and most preferred, all bars are conductive according to the present invention.

Once a test animal experiences a particular stimulus and reacts thereto by virtue of his movement throughout the enclosure, area contact between the animal's feet and the grid bars is made. Resistance of the network is substantially reduced, depending upon the area contact with the animal and the network voltage changes proportionately. The resistance network, illustrated by the grid bars and resistors, is a.c. coupled through capacitors 244 and 245 to an amplifier, in this case, a differential amplifier 250 where the voltage is increased by a factor of approximately 2,000. Proper selection of capacitors 244 and 245 is desirable so as to maximize the common mode rejection and thus preclude any ambient electrical interference that could be caused by variation of steady state conditions. Capacitors 244 and 245 are preferably matched within a one percentile capacitance range. Similarly, in the differential amplifier 250, resistors 251 and 252, 253 and 254, and 255 and 256 are also matched appropriately for the system to minimize common mode rejection. Operational amplifiers 257 and 258 need not be matched as mentioned above with respect to the capacitors and resistors, due to the fact that a variable resistor 259 is provided with amplifier 258 which may be adjusted for maximization of the common mode rejection. A further operational amplifier 260 is also provided to complete differential amplifier 250. Differential amplifier 250 amplifies the voltage pulse received from the capacitors preferably in a range of a ractor of 2,000 and is also a.c. coupled to a comparator 265 through a capacitor 267. Comparator 265 ignores the stray field at 60 Hertz from line current for other electrical applications. Adjustment may be made to variable resistor 266 to vary the sensitivity of the comparator.

Subsequent to comparator 265, a more detailed schematic of a one-shot multivibrator 270 is provided. Multivibrator 270 is designed for formation of proper pulses to be received by a logic system and, in general, provides a 5 volt pulse, 1 millisecond in duration. Multivibrator 270 is connected in line between the comparator and a second multivibrator 280. Second multivibrator 280 forms a pulse of 0.1 second in duration for use in electromagnetic applications. Positioned between multivibrators 270 and 280 in conjunction with a switching arrangement 291 is a divide-by-ten decade counter 290 which can be switched into the pulse line to facilitate recording when less resolution is desired. Adjacent multivibrator 280 is a transistorized driver 295 for a relay 297. Relay 297 when actuated by driver 295 upon receipt of a pulse therefrom, provides input to recording apparatus as desired.

Operation of the present invention proceeds in general as follows. An enclosure is provided and actuated by the supply of current to the resistor network. Current is maintained at a level below the tactile sensation of the particular animal being tested, and preferably lower than 50 microamps, though 500 microamps is a general level at which animals begin to sense the current passing through their bodies. A test animal such as a rat, mouse or the like, is placed in the enclosure as is subjected to a particular stimulus. Having been stimulated in a predetermined fashion, it is anticipated that the animal will react accordingly. It is desirable to determine the degree of movement made by the animal subsequent to receipt of the stimulus over a predetermined period of time. As the animal moves about, repeated foot contact is made with the grid bars that define the floor of the walled enclosure. At least a certain number of these grid bars are electrically conductive and are associated with the next adjacent electrically conductive grid bar by a resistor, whereby the grid bars and resistors form a resistor network.

The animal in making contact with the conductive grid bar lowers the resistance of the network by an amount proportional to the resistance of the area of the animal body in contact therewith. Voltage change across the network is determined by the change in area contact when the animal touches the electrically conductive grid bars, or removes a foot therefrom, is converted into a pulse, and provides an input to an amplifying system or other manipulating means as desired. In view of the fact that a stray electrical field surrounds line current at 60 Hertz, it is desirable to ignore this and other steady state ambient conditions that could otherwise influence validity of the data obtained by use of the present invention. Preferably therefore, a differential amplifier system is utilized to amplify the pulse from the resistor network and to negate the influence thereon of stray fields by means of the common mode rejection of same. Amplified voltage pulse output is now in a form to be further manipulated, depending upon the ultimate use of same and/or the recording apparatus or devices that are to use same in the evaluation of the animal activity. As described above, the voltage pulse may be shaped with a one-shot multivibrator or the like to provide input to a logic system. Additionally, a pulse of larger duration may be utilized to provide input to an electromagnetic system. Likewise, a transistorized driver and relay combination may be utilized to, in general, afford input to recording units.

Having described the present invention in detail, it is obvious that one skilled in the art will be able to make variations and modifications thereto without departing from the scope of the invention. Accordingly, the scope of the present invention should be determined only by the claims appended hereto.

What is claimed is:

1. Apparatus for measuring animal activity comprising:
   a. a walled enclosure;
   b. a plurality of electrically conductive elongated elements received along a lower end of said enclosure and at least partially defining an animal floor thereat;
   c. a plurality of resistors connected between said conductive floor elements and cooperating therewith to define a resistor network;
   d. a current supply connectable to said resistor network, whereby an animal making contact with said conductive elements reduces electrical resistance of the network and causes a voltage change;
   e. means to generate a pulse from said voltage change; and
   f. means to manipulate said pulse and to segregate said pulse from ambient electrical interference, whereby said pulse provides input to a predetermined type of recording system.

2. Apparatus as defined in claim 1 wherein said walled enclosure is produced at least in part from transparent panels.

3. Apparatus as defined in claim 1 wherein said floor of said enclosure is defined by said conductive elements only.

4. Apparatus as defined in claim 1 wherein said conductive elements extend completely across said enclosure and are spaced apart from each other.

5. Apparatus as defined in claim 1 wherein said enclosure is comprised of a plurality of plastic panels secured to each other, two opposing panels having a plurality of matching openings along a lower edge thereof, and wherein said elongated electrically conductive elements are received in said matching openings and define said enclosure floor thereby.

6. Apparatus as defined in claim 1 wherein said current supply has means to control the current at an amperage below the tactile threshold of the animal.

7. Apparatus as defined in claim 6 wherein said means comprise a regulated voltage supply and current limiting resistors.

8. Apparatus as defined in claim 6 wherein said means comprise a regulated current supply.

9. Apparatus as defined in claim 1 wherein said pulse manipulating means comprise an amplifier and an interface means between the amplifier and a recording system.

10. Apparatus as defined in claim 9 wherein the interface means comprise a multivibrator to shape the pulse for the particular recording system.

11. Apparatus as defined in claim 1 wherein said manipulating means comprise an amplifier, a comparator, two multi-vibrators, a digital counter, and a relay and driver therefor, only certain of said manipulating means being actuatable at one time, whereby said system may be utilized with different recording systems.

12. An animal activity monitoring unit comprising:
   a. a walled animal enclosure, said enclosure having a plurality of elongated elements secured to a portion of said enclosure wall at opposite ends and defining a floor of said enclosure, at least certain of said elongated elements being electrically conductive;
   b. resistors of predetermined value being connected across each adjacent electrically conductive element, and cooperating with said elements to define a resistor network, whereby upon receipt of a controlled current supply, a voltage change occurs when an animal makes contact with said conductive elements;
   c. means to convert said voltage change to a pulse; and
   d. means to manipulate said pulse to be compatible input for a particular pulse recording system, said means being connectable to said particular system.

13. Apparatus as defined in claim 12 wherein said enclosure walls are transparent to permit ready observation of an animal under study therein.

14. Apparatus as defined in claim 12 wherein all of said floor elements are conductive.

15. Apparatus as defined in claim 12 wherein said manipulating means comprises a plurality of different means, said different means being compatible with different recording systems, and switching means being included to actuate said different means as desired.

16. Apparatus as defined in claim 15 wherein said manipulating means comprise a differential amplifier, a voltage comparator, two multivibrators, a digital counter and a driver relay unit.

17. A method of monitoring animal activity comprising the steps of:
   a. placing a test animal in a walled enclosure, said enclosure having conductive grid bars defining a floor of same, said grid bars having resistors connected between adjacent elements and cooperating to define a resistor network;
   b. providing a controlled current supply to said resistor network;
   c. providing a stimulus for said animal;
   d. permitting said stimulated animal to move about within the enclosure, each footstep on said electrically conductive element generating a voltage change in said resistor network;
   e. converting said voltage change to a pulse; and
   f. manipulating said pulse to be compatible with a particular pulse recording system.

18. The method as defined in claim 17 wherein said current is no more than 50 microamps.

19. The method as defined in claim 17 wherein said generated pulse is amplified by a factor of at least 1,000 is segregated from ambient electrical influence and is shaped for the particular recording system.

* * * * *